United States Patent
Kulikov

(10) Patent No.: US 9,870,131 B2
(45) Date of Patent: Jan. 16, 2018

(54) EXPLORING INFORMATION BY TOPIC

(75) Inventor: Vitaliy Kulikov, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 939 days.

(21) Appl. No.: 14/343,820

(22) PCT Filed: Sep. 7, 2012

(86) PCT No.: PCT/UA2012/000084
§ 371 (c)(1),
(2), (4) Date: Jun. 3, 2014

(87) PCT Pub. No.: WO2013/048360
PCT Pub. Date: Apr. 4, 2013

(65) Prior Publication Data
US 2014/0331156 A1 Nov. 6, 2014

Related U.S. Application Data

(60) Provisional application No. 61/532,485, filed on Sep. 8, 2011.

(51) Int. Cl.
*G06F 3/048* (2013.01)
*G06F 3/0484* (2013.01)
*G06F 17/30* (2006.01)

(52) U.S. Cl.
CPC .... *G06F 3/04842* (2013.01); *G06F 17/30867* (2013.01)

(58) Field of Classification Search
CPC ......... G06F 17/30864; G06F 17/30867; G06F 17/30554; G06F 17/30696; G06F 17/3053;
(Continued)

(56) References Cited

U.S. PATENT DOCUMENTS 6,453,312 B1 * 9/2002 Goiffon ............ G06F 17/30643
7,237,258 B1 * 6/2007 Pantuso ............ G06Q 20/027
380/258
(Continued)

OTHER PUBLICATIONS

McGee, "Wolfram Alpha Redesigns for 2011," Jan. 15, 2011 [retrieved on Jan. 15, 2013]. Retrieved from the internet: URL<http://web.archive.org/web/28118115883846/http:// searchengineland.com/wolfram-alpha-redesigns-for-2811-61090>, pp. 1-3.
(Continued)

*Primary Examiner* — Linh K Pham
(74) *Attorney, Agent, or Firm* — Fish & Richardson P.C.

(57) ABSTRACT

Methods, systems, and apparatus, including computer programs encoded on computer storage media, for exploring information by topic. One of the methods includes determining, from a user input, a topic; selecting a first node from a plurality of nodes, wherein the first node is a collection of data about the topic; providing, for display in a user interface, a first threadlet, wherein the first threadlet includes an instance of the first node and a projection menu that includes a respective link to each of one or more projections, and wherein each of the one or more projections includes one or more threadlets that are instances of nodes that share a relationship to the topic; receiving a user input selecting a particular projection from the one or more projections; and providing, for display in the user interface, a set of threadlets from the particular projection.

15 Claims, 11 Drawing Sheets

(58) Field of Classification Search
CPC ............ G06F 17/2235; G06F 3/04886; G06F 17/30899; G06F 17/30994
See application file for complete search history.

(56) References Cited

U.S. PATENT DOCUMENTS

| | | | | |
|---|---|---|---|---|
| 7,953,730 | B1 | 5/2011 | Bleckner et al. | |
| 8,423,538 | B1* | 4/2013 | Sadikov | G06F 17/30463 707/706 |
| 8,782,066 | B2* | 7/2014 | English | G06F 17/30746 707/713 |
| 9,507,850 | B1* | 11/2016 | Hepp | G06F 17/30864 |
| 2005/0222987 | A1* | 10/2005 | Vadon | G06F 17/30864 |
| 2005/0283464 | A1* | 12/2005 | Allsup | G06F 17/30867 |
| 2006/0143568 | A1* | 6/2006 | Milener | G06F 17/30899 715/738 |
| 2006/0179039 | A1* | 8/2006 | Murarka | G06F 17/30657 |
| 2006/0206454 | A1* | 9/2006 | Forstall | G06F 17/30864 |
| 2008/0040221 | A1* | 2/2008 | Wiseman | G06Q 30/02 705/14.54 |
| 2008/0086457 | A1* | 4/2008 | Fei | G06F 17/30864 |
| 2008/0172374 | A1* | 7/2008 | Wolosin | G06F 17/3087 |
| 2008/0319947 | A1* | 12/2008 | Latzina | G06F 17/2785 |
| 2009/0234834 | A1* | 9/2009 | Cozzi | G06F 17/30867 |
| 2009/0320035 | A1* | 12/2009 | Ahlgren | G06F 9/468 718/104 |
| 2009/0327268 | A1* | 12/2009 | Denney | G06F 17/30053 |
| 2010/0057583 | A1* | 3/2010 | Jeffs | G06Q 10/107 705/26.1 |
| 2011/0016005 | A1* | 1/2011 | Li | G06F 17/30867 705/14.73 |
| 2011/0029891 | A1* | 2/2011 | Kim | H04M 1/72561 715/752 |
| 2011/0087749 | A1* | 4/2011 | Swink | H04L 51/32 709/206 |
| 2011/0196737 | A1* | 8/2011 | Vadlamani | G06F 17/30864 705/14.49 |
| 2011/0202533 | A1* | 8/2011 | Wang | G06F 17/30864 707/738 |
| 2011/0252060 | A1* | 10/2011 | Broman | G06F 17/30899 707/771 |
| 2011/0264648 | A1* | 10/2011 | Gulik | G06F 17/30867 707/722 |
| 2012/0284247 | A1* | 11/2012 | Jiang | G06F 17/30867 707/706 |
| 2013/0013427 | A1* | 1/2013 | Gonsalves | G06Q 30/02 705/14.73 |
| 2015/0242536 | A1* | 8/2015 | Surkov | G06F 17/30864 707/706 |

OTHER PUBLICATIONS

Anonymous, "Clickpath," Feb. 11, p. 1, Retrieved from the Internet: URL:http://web.archive.orgjweb/20100211175000/http://drupal.org/project/clickpath, [retrieved on Jan. 15, 2013].

International Search Report and Written Opinion in International Application No. PCT/UA2012/000084, dated Jan. 25, 2013, 13 pages.

International Preliminary Report on Patentability in International Application No. PCT/UA2012/000084, dated Mar. 12, 2014, 8 pages.

* cited by examiner

| Profession | Actor | Starring TV roles |
|---|---|---|
| Star Sign | Pisces | TV episode performances |
| Tracks Recorded | Zub Zub | Web Link(s) |

[Film performance]
Film      I Downloaded A Ghost

[Film performance]
Film      Marion Bridge

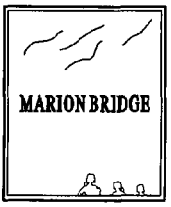

[Film performance]
Character      Ariadne
Film      Inception

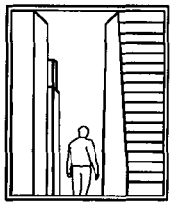

[Film performance]
Character      Juno MacGuff
Film      Juno

[Film performance]
Character      Kitty Pryde
Film      X-Men: The Last Stand

FIG. 4D

| Ellen Page |

Popular today: Alizée  Toronto  Cheshire Cat  Cambridge  Ellen Page   ──420

Ellen Page [Award Nominee, Award Winner, SNL host, Celebrity, Film actor]
Country of nationality    Canada
Place of birth    Halifax
Profession    Actor
Star Sign    Pisces

《                                                              ──450  》

[Film performance]
Character    Juno MacGuff
Film    Juno

──460

Like!                                        Node link   Projection link

Juno [Award-Nominated Work, Award-Winning Work, Movie, W Film]
Directed by    Jason Reitman
Languages    English Language
Notable filming locations    Vancouver
Production companies    Fox Searchlight Pictures

Juno is a 2007 comedy-drama film directed by Jason Reitman and written by Diablo Cody. Ellen Page stars as the title character, an independent-minded teenager confronting an unplanned pregnancy and the subsequent events that put pressures of adult life onto her. Michael Cera, Olivia Thirlby, J. K. Simmons, Allison Janney, Jennifer Garner and Jason Bateman also star. Filming spanned from early February to March 2007 in Vancouver, British Columbia. The film premiered on September 8 at the 2007 Toronto International Film Festival, receiving a standing ovation. The film won the Academy Award for Best Original Screenplay and earned three other Oscar nominations, including Best Picture and Best Actress for Page. ...

──465     ──466
Summary   Images   Videos   Note   Comments   App developer

FIG. 4E

EXPLORING INFORMATION BY TOPIC

BACKGROUND

This specification relates to providing information about topics.

While the Internet has experienced explosive growth, the basic way we browse information online has remained largely unchanged. In particular, the web is still a predominantly page and site-centric environment with information about the same topic often scattered across a large number of different websites.

SUMMARY

In general, one innovative aspect of the subject matter described in this specification can be embodied in methods that include the actions of determining, from a user input, a topic; selecting a first node from a plurality of nodes, wherein the first node is a collection of data about the topic; providing, for display in a user interface, a first threadlet, wherein the first threadlet includes an instance of the first node and a projection menu that includes a respective link to each of one or more projections, and wherein each of the one or more projections includes one or more threadlets that are instances of nodes that share a relationship to the topic; receiving a user input selecting a particular projection from the one or more projections; and providing, for display in the user interface, a set of threadlets from the particular projection.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can optionally include one or more of the following features. The topic can be an entity represented by a node in an online database of structured data, and wherein the first node includes data from the node in the online database of structured data that represents the entity. The method can further include updating a thread that identifies threadlets displayed to the user to include the first threadlet, wherein each threadlet in the thread is associated with data that indicates a role of the threadlet in the thread, and wherein updating the thread comprises generating data that indicates that the first threadlet in the thread has a body threadlet role. The method can further include in response to receiving the user input selecting the particular projection, modifying the role of the first threadlet to a tail threadlet role. Threadlets adjacent to each other in the thread can be displayed adjacent to each other in the user interface. The method can further include: determining, for each threadlet in the thread, whether to display a minimized representation or a maximized representation of the threadlet based on the role of the threadlet in the thread, comprising: determining that the first threadlet has a body threadlet role; and providing a maximized representation of the first threadlet for display in the user interface. The method can further include: determining that the role of the first threadlet has been modified to a tail threadlet role; and providing a minimized representation of the first threadlet for display adjacent to the set of threadlets from the particular projection. The method can further include: receiving a user input selecting a link to a particular projection included in a particular threadlet from the set of threadlets; updating the thread to include the particular threadlet, wherein updating the thread comprises generating data that indicates that the particular threadlet in the thread has a tail threadlet role; and providing the particular projection for display adjacent to a minimized representation of the particular threadlet in the user interface, wherein the minimized representation of the particular threadlet is displayed adjacent to the minimized representation of the first threadlet in the user interface. The particular projection can be a topic projection that includes only a single threadlet that includes an instance of a node that represents a particular topic. The method can further include: receiving a user input selecting the minimized representation of the first threadlet; and providing the maximized representation of the first threadlet for display in the user interface in place of the particular projection, the minimized representation of the particular threadlet, and the minimized representation of the first threadlet.

Particular embodiments of the subject matter described in this specification can be implemented so as to realize one or more of the following advantages. Information can be organized and explored by topic. A variety of data from any number of sources can be provided to users in one place. By following a link to a projection, a user can explore information about any number of nodes and can understand the additional semantic meaning carried by the projection.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 4A-4G are display diagrams that show the functionality of exploring data in terms of nodes and projections.

Like reference numbers and designations in the various drawings indicate like elements.

DETAILED DESCRIPTION

Figure 1:
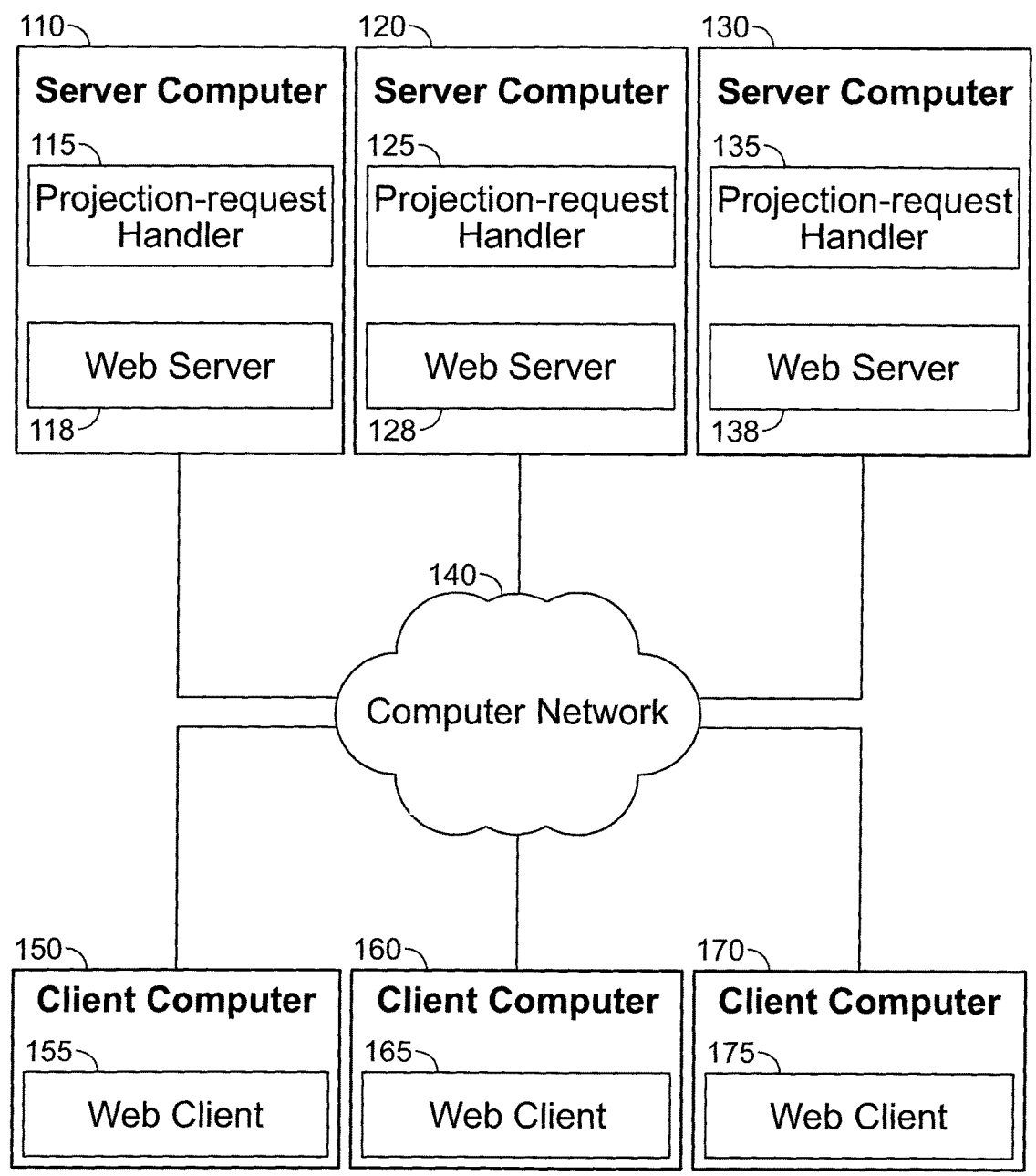
FIG. 1 is a block diagram that shows an example system for processing projection requests.

Generally, this specification describes systems where data from multiple sources can be represented and displayed in terms of nodes and relationships between nodes, also known as projections. A node is a serializable piece of data that can be interpreted and displayed in a variety of different contexts. A projection is an ordered collection of zero or more nodes. For instance, a video resource, defined by its uniform resource locator (URL) and optionally accompanied by additional information, e.g., the video title, is an example of a node. A list of related videos ordered by popularity is an example of a projection. Similarly, in an online database of structured data, a semantic entity that represents Canadian actress Ellen Page may be a node. An example of an online database of structured data that exists is the Freebase database that is accessible on the Internet at http://www.freebase.com. The list of nodes that represent films, i.e., film nodes, with Ellen Page in the lead role ordered by the film title is one possible Ellen Page projection. The same set of film nodes but ordered by the film release date is another.

Nodes and projections may be considered to be basic units of information used to describe various entities in terms of their intrinsic qualities and their relationships to other entities, respectively. Nodes and projections can also serve as basic units of navigation. When displayed, each node can lead to zero or more projections, and each projection in turn can lead to zero or more other, possibly different nodes. By following a series of nodes and projections, a user can explore the data space around a particular starting node, even if nodes and projections in question span data from multiple different sources. For example, by starting from the Ellen Page entity node in the online database of structured data and following the projection of film nodes with Ellen Page in the lead role, a user can get to the "Juno" film entity node. From there, by following a projection of "Juno" soundtrack clips on a video hosting website, one can proceed to an "All I Want Is You" soundtrack video. By following a projection that identifies users of an online social network who liked the video, one can find their way to the user of the social network who was the first to like that video, and so on.

The number and order of nodes in a projection as well as their identity does not have to be fixed and can change over time. In the video example above, the underlying video stream may be replaced with a more compact version. Similarly, the order of videos in the related-videos projection may depend on the ever-changing popularity of individual videos. Additionally, the number of videos in the same projection may change as videos are added or removed.

Because the number of nodes in a projection can be large, nodes can be fetched and displayed in small groups, also referred to in this specification as "shards." Generally, only one shard is displayed at a time. The number of nodes in a shard can depend on a variety of factors, e.g., the type of the projection or the size of the target display area. Each projection shard is loaded independently in response to a separate projection request. A projection request is a serializable piece of data that can be interpreted to decide what nodes must be returned as part of the shard in question. Those skilled in the art will recognize that it is also possible to (pre-) load multiple shards for caching or other purposes. If one wants to proceed to the next, return to the previous, or jump to a different shard, they can do so by issuing another projection request, often based on additional information provided as part of the last successful projection response.

FIG. 1 is a block diagram that shows an example system for processing projection requests. The system includes client computers, e.g., client computers 150 and 160, connected to server computers, e.g., server computers 110 and 120, via a computer network 140. Each client computer has a web client computer program, e.g., web client program 155, that is used to issue projection requests as well as to process and to visualize projection response data. Each server computer has a web server computer program, e.g., web server program 118, and a projection-request handler program, e.g., projection-request handler program 115, that are used to respond to incoming projection requests with projection response data.

Each projection defines a relationship that separates nodes that are part of the projection from those that are not and organizes nodes in the relationship according to a particular principle or dimension. That is, a number of projections may return the same set of nodes ordered differently. In some implementations, related projections, e.g., projections that contain the same set of nodes ordered differently, are placed into groups of projections called families. For example, three projections that represent the set of films with Ellen Page in the lead role sorted lexicographically by the film name, the name of the character played by Ellen Page, and the film release date respectively may all belong to the same family of projections. When a particular projection is displayed, the information about its family relations can be used to suggest other projections to the user. Because any projection can be defined by its original projection request, it can also appear as a node in some other projection. For example, it is possible to have a projection of all projections in a particular family. As another example, it is possible to have a projection that consists of a single node that represents the projection itself.

Each projection defines a relationship that separates nodes that are part of the projection from those that are not. It can also provide information about how different nodes in the projection relate to each other. For example, in some implementations, nodes in the same projection are organized according to keys. Each key consists of a sequence of one or more delimiter-separated tokens called keylets, which are themselves delimiter-free. A key that can be obtained from another key by appending an instance of the delimiter string followed by a keylet is referred to as a direct child of the latter key, which in turn is referred to as the parent key or simply the parent. Because nodes are organized according to their keys, being able to organize keys in parent-child pairs makes it possible to organize nodes in parent-child pairs and from there into arbitrary tree structures. By maintaining multiple keys per node, the model can be extended to organize nodes into arbitrary acyclic directed graphs. This functionality may be useful in a variety of different situations, e.g., displaying multiple levels of references and replies to a post node in an online discussion, with child post nodes displayed at an offset relatively to their respective parent post nodes.

In some implementations, the system maintains two keys per node: a forward key used to organize nodes in what is generally perceived as the forward direction and a reverse key used to organize nodes in what is generally perceived as the reverse direction. While maintaining one key per node is usually sufficient, two keys per node are sometimes required to organize nodes in complex projections with multi-keylet keys.

The same node can appear multiple times in different projections or even as part of the same projection. For example, the Ellen Page entity node may appear both in a projection of famous people born in Halifax, Nova Scotia and in a projection of actors in "Juno." If multiple instances of the same node appear in sufficiently different contexts, they may be displayed and handled differently. To distinguish between multiple instances of the same node, the concept of a threadlet may be introduced. A threadlet is a node instance in a particular context, with each context, and therefore each threadlet, being unique. This leads to a more constructive definition of the projection as an ordered collection of zero or more threadlets.

As the user browses from one node to another, threadlets act as unique labels that mark the user path through the space of nodes and projections and provide a way to unroll the path to return to some previous state. The path can intersect itself at many different nodes, but the sequence of threadlets that mark the path is always linear. This sequence of threadlets is referred to in this specification as a "thread." When a thread is displayed, strictly speaking, it is its threadlets and not nodes that are displayed. Two or more threadlets that refer to the same node may be displayed differently, although given that each node may appear in multiple projections, it is common for the threadlet display functionality to rely on the display functionality of the underlying node. Because of their similarity, terms "node" and "threadlet" are often used interchangeably, with "threadlet" used more often when multiple node instances are discussed in the context of the same projection or thread.

The functionality of exploring data in terms of nodes and projections can be visualized in a variety of ways. One example layout displays the list of nodes visited as a stack of threadlets, starting with the first threadlet visited at the top and growing downwards as the user continues browsing from one node to another. Already-visited threadlets, excluding the threadlet visited last, are referred to as tail threadlets. The last-visited threadlet is referred to as the body threadlet. Each thread can have at most one body threadlet: an empty thread may have no threadlets at all or a single null threadlet that is not displayed but may play the role of the body threadlet. The body threadlet may also be accompanied by multiple projections of nodes "reachable" from the body threadlet, usually displayed one projection shard at a time. Threadlets that are part of one of the body threadlet projections are called head threadlets. The property that defines if a particular threadlet is a tail, a body, or a head threadlet is referred to as the threadlet role. Each live threadlet has a role, but the threadlet role can change many times during the threadlet lifetime. Those skilled in the art will recognize that the number and kind of different roles does not have to be limited to tail, body, and head roles.

A typical thread consists of zero or more tail threadlets, at most one body threadlet, and zero or more head threadlets. If the user selects one of the head threadlets, the body threadlet becomes a tail threadlet, the head threadlet selected becomes the body threadlet, and other head threadlets at the same level are hidden from view. If the user selects one of the tail threadlets, the tail threadlet becomes the body threadlet, and the part of the thread below is truncated. The last scenario usually happens if the user wants to return to a previously-visited threadlet in the thread, possibly to follow a different path from there.

If a thread is truncated, what happens to truncated threadlets depends on the implementation. They may be permanently destroyed. Alternatively, they may be removed from the thread but kept in memory or otherwise cached in case the user decides to "undo" the action or decides to re-visit one of the underlying nodes later. As another alternative, some threadlets may be permanently erased and some preserved for future use. In some popular layouts, projection threadlets of the newly-selected body threadlet are not only preserved but are kept as head threadlets and are displayed as such.

Each threadlet can be displayed either minimized or maximized, depending on the role it plays in the thread. For example, tail threadlets are generally displayed minimized. The body threadlet is generally displayed maximized. Head threadlets are generally displayed minimized. However, a head threadlet is often displayed maximized if it happens to be the only threadlet in a projection. The parameter that controls how a threadlet is displayed based on the role it plays in the thread is referred to in this specification as the threadlet type. Two example threadlet type values are abbreviated SLS and SLL, where S and L stand for "small" and "large," respectively. The SLS value indicates that the threadlet is to be displayed as minimized when it is a tail threadlet, maximized when it is a body threadlet, and minimized when it is a head threadlet. Similarly, the SLL value indicates that the threadlet is to be displayed minimized when it is part of the thread tail and maximized otherwise.

Because a node can change with time, it is possible to encounter multiple versions of the same node of different freshness. From the user perspective, multiple instances of the same node are expected to be in sync to reflect the state of the most recently updated instance. However, this raises the question of the node identity—that is, what nodes must in fact be considered different instances of the same node. Simply comparing nodes based on their contents is not an option as no newly-updated version of the node would match an old one. To address the issue, a threadlet may have one or more so-called shared id-s. Two threadlets with a matching shared id are recognized as two instances of the same node and are kept in sync to reflect the state of the most recently updated node. In some implementations, the system may impose restrictions on the use of shared id-s to prevent malicious projections from overriding existing nodes from other sources.

It is possible to display two or more threadlets differently in different contexts, even if they refer to the same node. For example, this functionality may be achieved by using the concept of a projection menu as well as so-called node and threadlet features. The projection menu is a general way to display information specific to a particular threadlet. Each menu item in the projection menu comes accompanied by a label that helps the user recognize and select the item. Depending on the nature of the menu item in question, once selected, it can either load a new projection, or display additional information, or both. In particular, as part of a menu item selection, in some implementations, it is possible to display an arbitrary node, either statically defined as part of the menu item definition or loaded dynamically as part of an arbitrary projection request. The latter functionality is especially useful, because it makes it possible to load additional node- and context-specific information on demand, only when the menu item in question is selected, as opposed to pre-loading the same information for each of what may be many nodes in a projection shard. The projection menu can be part of the projection response protocol and may optionally be defined for each threadlet. The type of the node in question, the node data, the type of the projection, and a variety of other factors may be used to decide on the contents of the projection menu for a threadlet.

Node and threadlet features are used to describe node- and threadlet-specific features, respectively. Features are part of the projection response and are optional. The web client program is free to ignore any node or threadlet feature definition that it does not understand. Node features are specified as part of the node definition and apply to all the instances of the node in question if the node is shared. Threadlet features are defined as part of the threadlet definition and apply only to the threadlet in question.

Features are used to provide arbitrary node- and threadlet-specific functionality that cannot be provided using other mechanisms, e.g., the projection menu. For example, in some implementations, a number of services can be built on top of the general platform functionality. One such service allows the user to endorse an arbitrary node. For nodes that come accompanied with additional type information expressed as a node feature, the implementation makes it possible to classify nodes by type. For example, Ellen Page can be classified as both an actress and a music artist.

Therefore, if someone adds Ellen Page to the list of nodes they endorse, it can be filed under both categories, which then makes it easy for the user to find Ellen Page both in the list of their favorite actresses and in the list of their favorite music artists.

A projection request-response protocol for communication between the web client and the web server can be implemented in a variety of different ways. In some implementations, each projection request is encoded as a set of data fields, including the address of the destination web server, the request data, and the request type along with the request-data major and minor encoding version numbers used to interpret the request data. To load a projection shard as defined by its projection request, the web client program sends the request to the destination web server. The destination web server program receives the request and passes it to a projection-request handler program often implemented as part of the web server.

Figure 2:
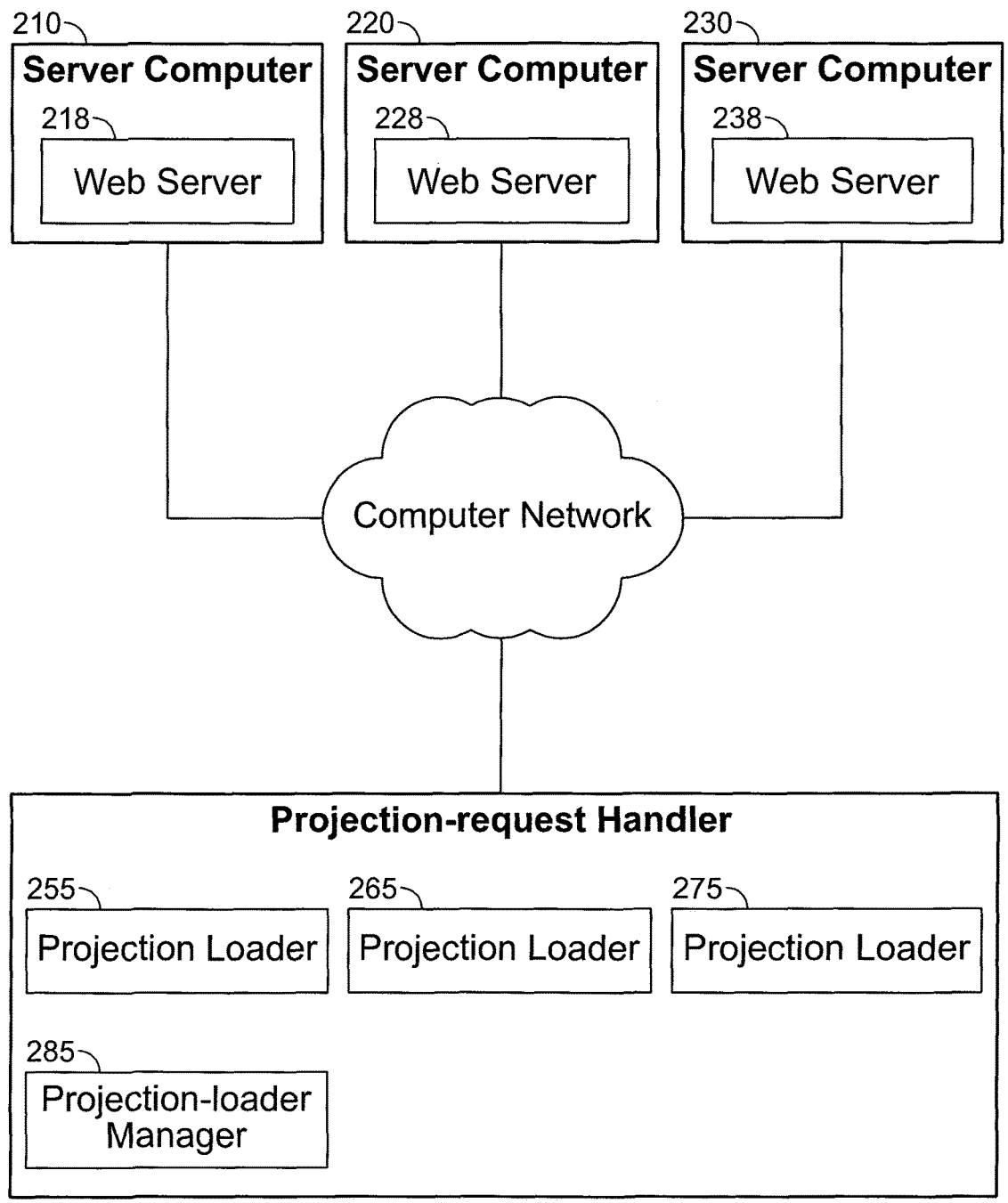
FIG. 2 is a block diagram that shows an example projection-request handler.

FIG. 2 is a block diagram that shows an example projection-request handler. The projection-request handler can be implemented as one or more computer programs on one or more computers in one or more locations. The projection-request handler includes a projection-loader manager 285 and projection loaders, e.g., projection loaders 255 and 265, that are registered with the projection-loader manager. Each projection loader handles projection requests with a matching request type and request-data major encoding version number. The projection-request handler uses the projection-loader manager to forward the request to the appropriate loader based on the request type and the request-data encoding version information. If a matching loader is found, the loader interprets the request data based on rules defined as part of the loader. Based on the interpretation of the request data, the loader makes requests to one or more server computers, e.g., server computers 210 and 220, to retrieve any projection data necessary. Once the data is retrieved, the loader uses the data to construct a projection response. The response includes a set of individual threadlet fields as well as up to three projection-request fields: one for the next forward shard, one for the next reverse shard, and one for the current shard, if the canonical projection request for the shard differs from the received request. Each individual threadlet field in the projection response is similarly encoded as a set of data fields, including the threadlet forward and reverse keys, the node data, and the node type along with the node-data major and minor encoding version numbers used to interpret the node data. The handler returns the response to the web server, which communicates it back to the client that initiated the inquiry.

Figure 3:
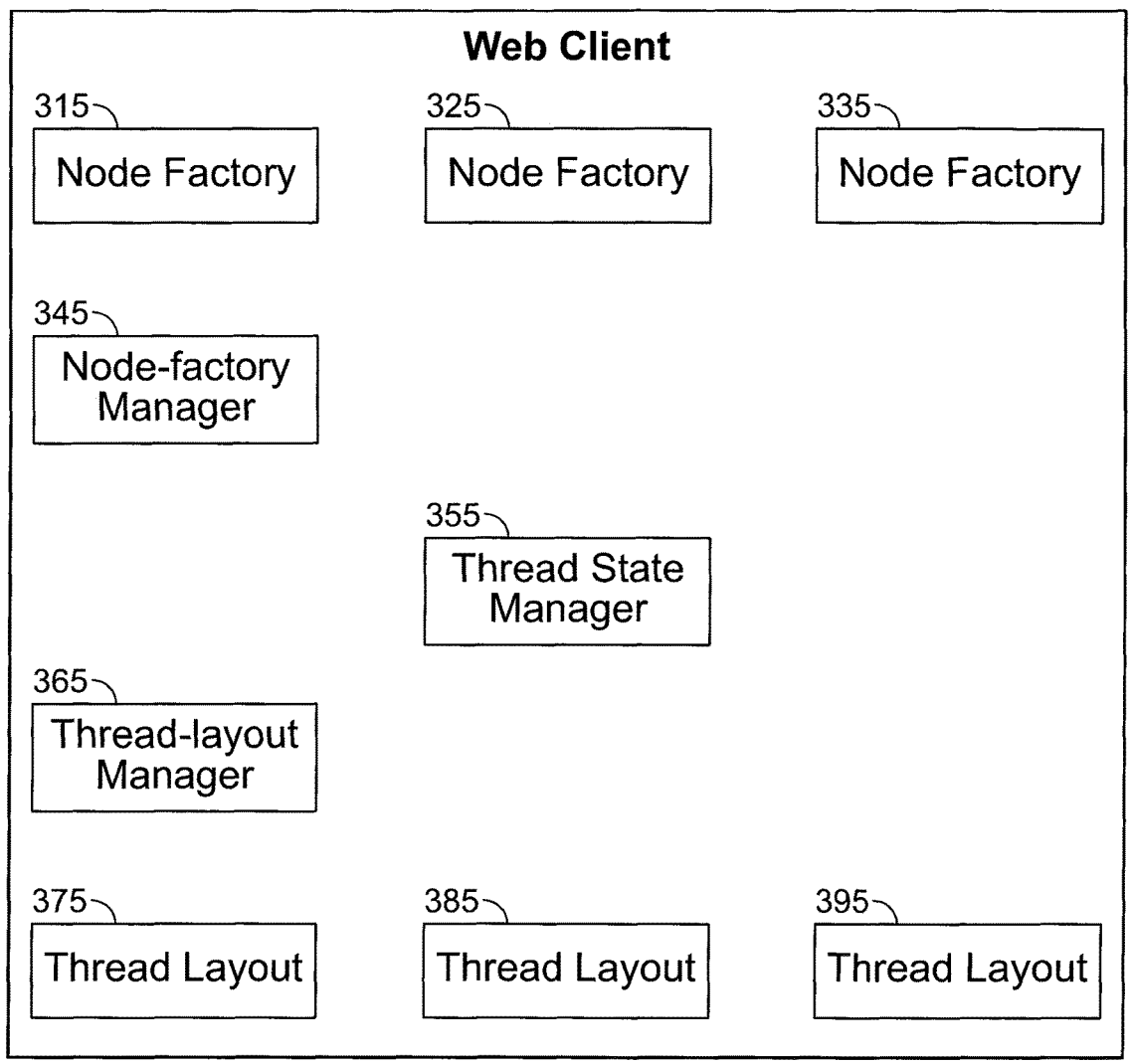
FIG. 3 is a block diagram that shows an example web client.

FIG. 3 is a block diagram that shows an example web client. The web client can be implemented as one or more computer programs on one or more computers in one or more locations. The web client includes a node-factory manager 345, a thread-state manager 355, a thread-layout manager 365, and node factories and thread layouts, e.g., node factories 315 and 325 and thread layouts 375 and 385. Each node factory is registered with the node-factory manager and is capable of instantiating nodes with a matching node type and node-data major encoding version number. Each thread layout is registered with the thread-layout manager.

For each threadlet in the projection response, the web client uses the node-factory manager and a matching node factory to instantiate the threadlet node, followed by the threadlet itself. Once instantiated, the threadlet node is equipped with display functionality to display itself either as minimized or maximized. The threadlet maintains a reference to its node and, depending on the threadlet type and role in the thread, can display itself either as minimized or maximized, relying on the display functionality of the underlying node. Once all threadlets in the projection shard are instantiated, the thread-state manager is notified and the state of the thread is updated to include the new shard and its threadlets. It is the thread-state manager that is responsible for updating roles of individual threadlets in the thread. Once the state of the thread is updated, the web client uses the thread-layout manager to locate the currently-active thread layout and uses the layout to visualize the thread in its new state.

Nodes and projections can be used to describe and to visualize arbitrary data. The system, however, is especially powerful when used to explore entities from different data sources and connections between them. For example, using the earlier book example, one may endorse or share a book on a social network, look up the author of the book using an Internet search engine, find an image of the book cover using an image search engine, and explore similar books on an online retailer. By resolving different instances of the same book entity across a number of services to a single well-defined entity, one can display more information about the entity in one place and also use the resolved entity to establish connections between other related entities.

In some implementations, entities are resolved by taking advantage of the semantic data available as part of an online database of structured data. In the online database of structured data, a large number of well-defined entities may be classified by type and expressed in terms of their relationships to other entities as well as identifiers from various authoritative sources. This data in the online database can be thought of as a large graph with entities (nodes) connected by relationships (projections) and can provide a way for "stitching" various data sets. For example, if two book entities, one on a social network and one on an online retailer, map to the same resolved entity in the online database of structured data, they can be treated as two different instances of the same entity as opposed to two different entities. This makes it possible to display both social network and online retailer projections for the resolved entity and possibly to build new projections between other related social network and online retailer entities. That is, the book entity from the online database of structured data becomes the common node and a bridge between two separate data sets, something that may be used in some implementations to provide the user with a transparent mechanism for exploring information from multiple sources in one place.

FIGS. 4A-4G are display diagrams that show the functionality of exploring data in terms of nodes and projections, visualized using a thread layout that displays a thread as a stack of threadlets, starting with the first threadlet visited at the top and growing downwards as the user continues browsing from one node to another.

Figure 4A:
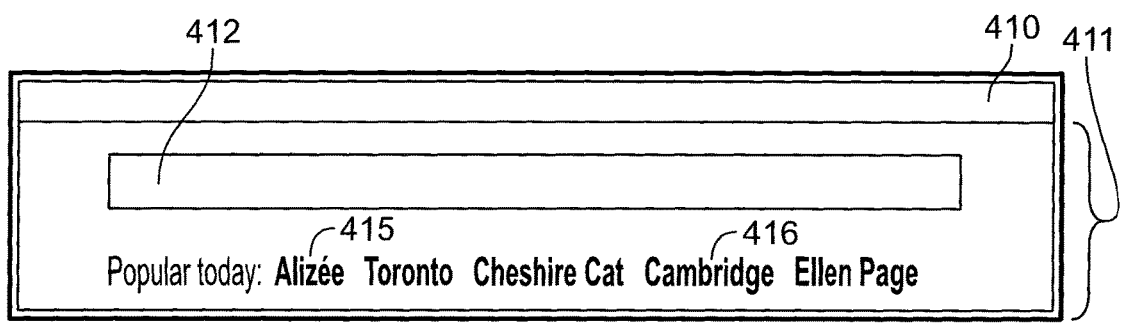

FIG. 4A shows the thread in its initial state, instantiated with a threadlet 410. Threadlet 410 is a threadlet with a topic-search node 411 that the user can use, to search for a variety of topics of interest. In addition to a search box 412, the topic-search node provides a list of popular-topic projection links, e.g., projection links 415 and 416. The user can load a topic of interest as a threadlet in a topic projection either by typing the name of the topic inside the search box or by selecting one of the popular-topic projection links.

Figure 4B:
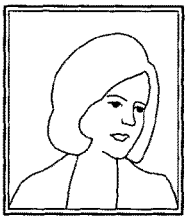

When the user inputs "Ellen Page" as the topic of interest, threadlet 410 loads threadlet 420 as part of a one-threadlet topic projection, as shown in FIG. 4B. As a threadlet in a newly-loaded SLS projection, threadlet 420 would normally become a head threadlet in the thread and be displayed minimized. However, the projection request-response protocol may provide a way to override the default behavior, and, as the only threadlet in a topic projection, threadlet 420 is loaded as the body threadlet and is displayed maximized. Threadlet 410, in turn, changes its role to a tail threadlet.

Threadlet 420 is displayed as a combination of an "Ellen Page" topic node 421 and a projection menu 422 immediately below the topic node. The projection menu includes menu items, e.g., menu items 423 and 424. Menu item 423 is a topic-summary item selected by default and displayed as a topic-summary node, with a list of projection links, e.g., projection links 425 and 426, that the user can use to explore additional information about Ellen Page in terms of nodes and projections.

Figure 4C:
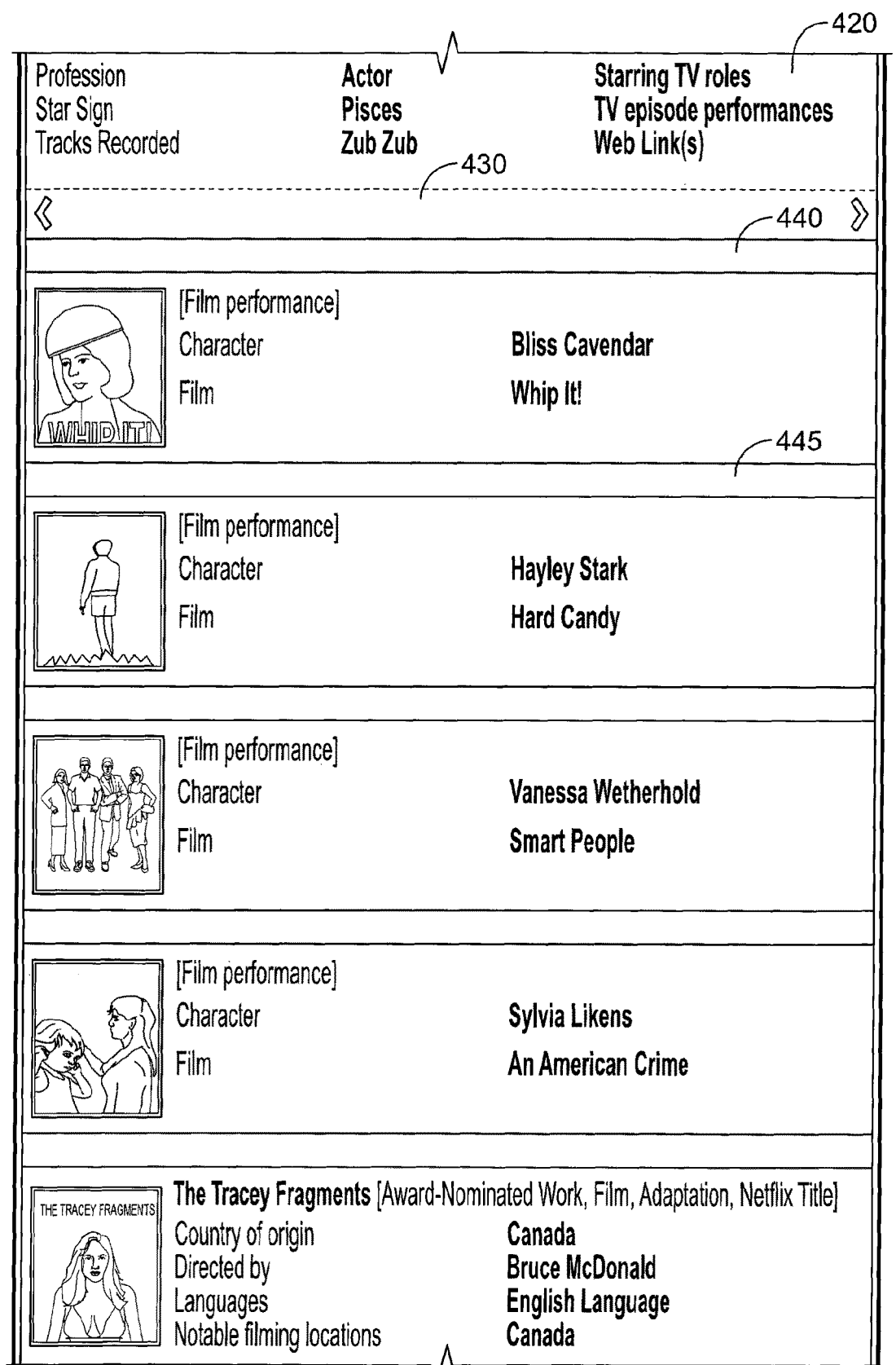

When the user selects projection link 425 labeled "Film performances", threadlet 420 loads a projection of topic threadlets that correspond to various film performances by Ellen Page. Because the number of threadlets in the projection is large, they are displayed as minimized head threadlets in shards of five threadlets at a time. FIG. 4C shows the first shard of five film-performance threadlets, e.g., threadlets 440 and 445, displayed in a vertical list below a navigational menu 430 that provides a way to navigate between multiple shards in the same projection if there is more than one. The navigational menu is displayed below topic threadlet 420. As the number of threadlets in the thread grows and becomes too large for all of them to be displayed in sufficient detail, the thread layout automatically re-aligns the viewport to show the most recently loaded threadlets or any other part of the thread considered important. The user can also navigate to any part of the thread by scrolling or using keyboard shortcuts. Other techniques for navigating between shards in a projection or through a thread are possible. For example, in some implementations, a user may navigate between shards or through the thread using, e.g., touch inputs on a touchscreen device, voice inputs, a motion input using a motion sensing device, and so on.

When the user navigates to the next shard, the next five film-performance head threadlets, e.g., threadlets 450 and 455, are displayed minimized in a vertical list below the navigational menu, replacing film-performance threadlets of the previous shard, as shown in FIG. 4D. The user can further explore information about any particular film performance by selecting and maximizing the threadlet in question. Alternatively, the user can select one of the projection links displayed as part of the threadlet, in which case the threadlet is automatically made the body threadlet and displayed maximized before the link projection is loaded.

When the user selects projection link 451 labeled "Juno", threadlet 450 becomes the body threadlet and loads threadlet 460 as part of a topic projection, as shown in FIG. 4E. As the only threadlet in a topic projection, threadlet 460 becomes the body threadlet in the thread of four threadlets, with threadlets 410, 420, and 450 as tail threadlets. Similarly to threadlet 420, threadlet 460 is displayed as a combination of a "Juno" topic node 461 and a projection menu 462 immediately below the topic node. The projection menu includes menu items, e.g., menu items 465 and 466, with the topic-summary item selected by default.

Figure 4F:
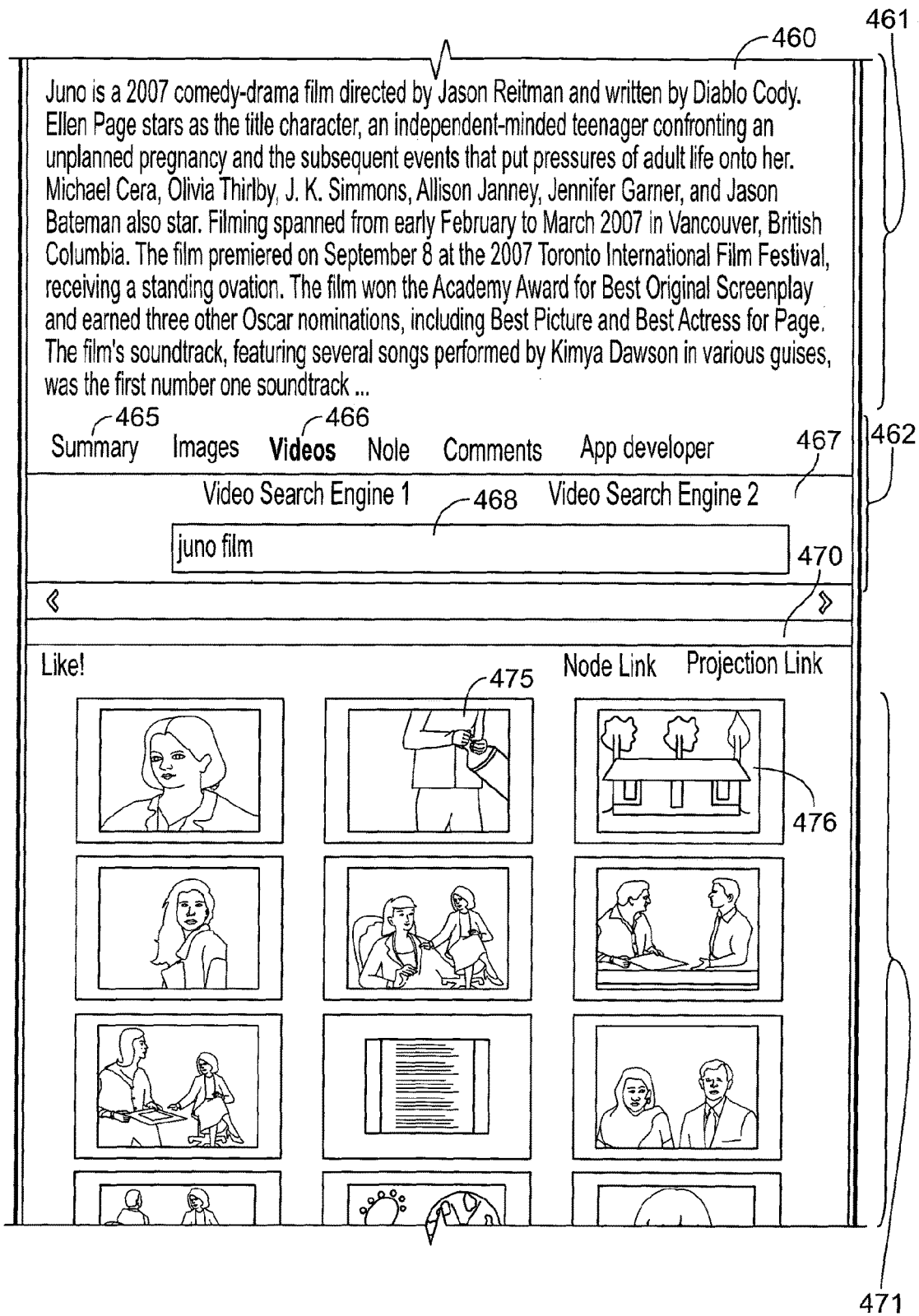

When the user selects menu item 466 labeled "Videos", the menu changes to display a video-search node 467 associated with the menu item, instead of the topic-summary node associated with the previous menu selection, as shown in FIG. 4F. The video-search node is displayed with a selection of two search engines and a search box 468 pre-populated with a search query "Juno film" based on the name of the context topic and automatically disambiguated to distinguish between a variety of topics named "Juno". The user may change the search query by typing inside the search box. If that happens, the query is logged in the context of threadlet 460 and can later be used as a search-suggestion within the same or similar contexts.

When menu item 466 is selected, it also instructs threadlet 460 to load a projection of video search results, using the pre-populated query. Depending on the search-engine selection, a different video search-results projection is loaded. The search-results projection shown in FIG. 4F is an SLL projection that displays video search results one results-page threadlet at a time, e.g., threadlet 470, with individual search results displayed as thumbnails, e.g., thumbnails 475 and 476. As always, the user can navigate between multiple shards in the projection, and therefore between multiple pages of search results, by using the navigational menu.

Figure 4G:
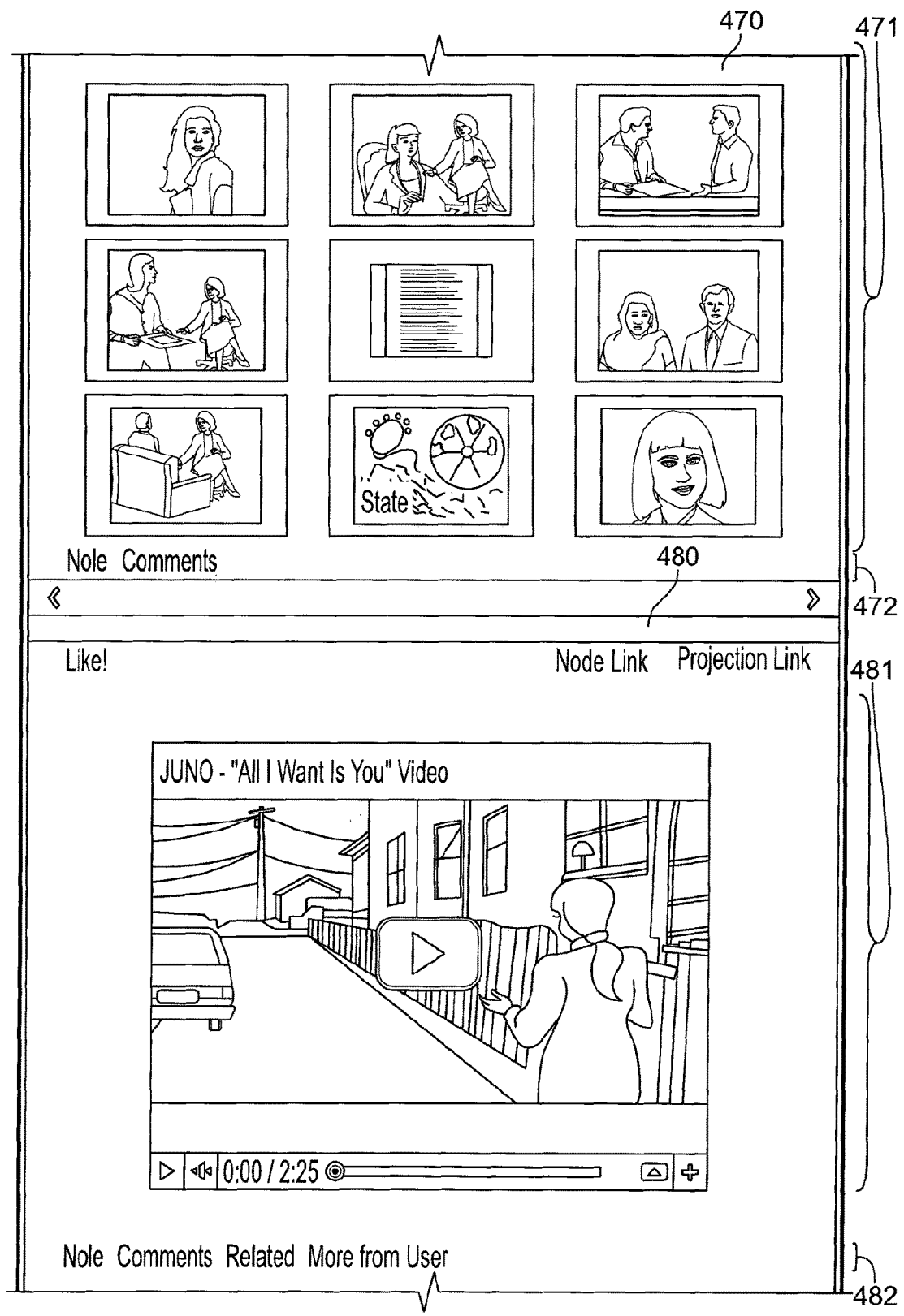

When the user selects thumbnail 475 on the search-results page, threadlet 470 loads a one-threadlet video projection with threadlet 480 as the only threadlet, as shown in FIG. 4G. Threadlet 480 is displayed as a combination of a video node 481 and a menu 482. Because the nature of threadlet 480 is different from that of topic threadlets considered earlier, menu 482 includes a different list of menu items and does not have a menu item selected by default. The user can use different menu items to continue exploring the data space around threadlet 480 or scroll up to one of the previously loaded threadlets in the thread and continue exploring from there.

In some implementations, projections are not limited to the default set of projections implemented as part of the system. For example, the projection request-response protocol may be general and may be designed to make it simple for anyone with basic development skills to implement a so-called third-party projection. To address discoverability and targeting of projections, in some implementations, it is possible for projections to declare what kind of nodes they can target. For example, a third-party projection may choose to target only a particular node or a collection of nodes of a particular type or some combination of types. This is especially applicable to entity nodes, e.g., entity nodes from the online database of structured data, which, in addition to sharing the same topic node type, are classified in terms of entity types in the online database. Because third-party projections can provide arbitrary application-like functionality, they are also often referred to as applications.

If the user browses a node that is being targeted by one or more projections, the user can explore the list of projections that target the node, possibly with projection labels accompanied by user ratings and other helpful information. The user can select and load any projection they like. If a third-party projection gets selected, the target node data is sent to the third-party projection web server as part of the projection request. Because any node of a particular type and encoding version has well-defined encoding and data format, any node can be used for projection targeting. The projection web server examines the request along with the embedded node information and generates a response. For security reasons, in some implementations, third-party projection requests may be routed via a trusted web server before forwarding them to their respective destination web servers. The trusted server can be used to verify the destination web server credentials and possibly "disconnect" malicious third-party servers from the rest of the system.

If the user finds a projection that they like, they have an option to associate the projection with their user profile, that is, an option, to "install" the projection. For nodes that they target, installed projections appear in a prominent view, making it easier to select them. Those skilled in the art will recognize that installed projections may be presented to the user in a variety of different ways. Making use of the projection "install" feature and other signals can make projection targeting even better.

A simple weather-forecast projection is one example of a third-party projection. If a projection developer has access to weather-forecast data, say, in the US, they can target their projection to entity nodes that are geographical locations in the US. Then, every time their projection gets selected, a node that represents a geographical location in the US is sent to the projection web server as part of a projection request. Because the developer knows what kind of nodes the weather-forecast projection can target, they can correctly interpret the entity node data in the request, retrieve geographical coordinates of the location in question, use the coordinates to lookup weather-forecast data, and send back a projection response with, e.g., five different nodes, one for each day of the forecast.

In some implementations, third-party projections are supported and developer tools to help with projection development and debugging are provided. For example, each topic threadlet can be equipped with a projection-menu item labeled "App developer" that loads a special application-launcher projection.

Figure 5:
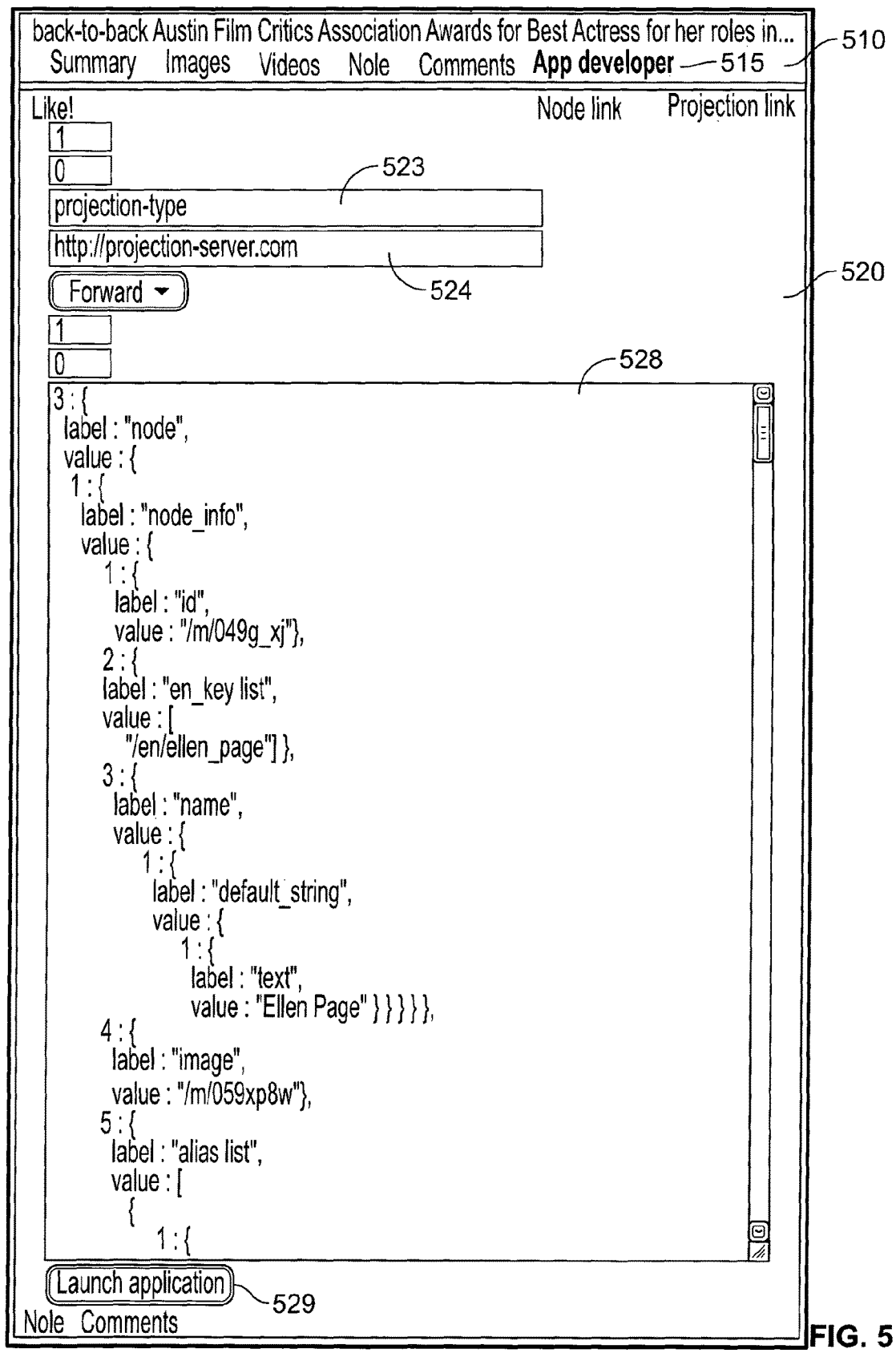
FIG. 5 is a display diagram that shows an example application-launcher threadlet.

FIG. 5 is a display diagram that shows an example application-launcher threadlet 520. The application launcher provides the developer with a way to examine and possibly edit target-topic node data 528 to be sent as part of a third-party projection request of type 523 to the destination projection web server of the developer choice, e.g., web server 524.

Given that each node type and encoding of the node data for that type and version are well-defined, using nodes for targeting and discoverability of projections provides a number of unique advantages not available anywhere else on the web. Because each projection is likely to target only a subset of nodes, it will appear to the user only for those nodes that it can handle. As a result, at any moment during their browsing experience, the user is exposed only to the projection data that they may actually be interested in.

More importantly, once a projection is selected, the projection web server gets access to the target node and possibly other data sent as part of the projection request, that is, the context and the input data that the server may require to generate a proper projection response, often without any additional involvement from the user. For example, the weather-forecast projection described earlier should be able to display weather information for a location entity node solely based on the geographical coordinates retrieved from the projection request. Unlike a typical weather-forecast site, it would not need to request the user to provide the name or other information, e.g., the location ZIP code, to uniquely identify the location in question.

Multiple projections from the same and even different third-parties can be bundled together to form an "application group"—a collection of projections generally installed together. This can serve as a convenience feature or sometimes be necessary to provide the user with the best user experience, if two or more projections are designed to work together.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
   determining, from a user input, a topic;
   selecting a first node from a plurality of nodes, wherein the first node is a collection of data about the topic;
   identifying a stack of threadlets that are sequentially viewable by a user starting from a first threadlet visited at a top of the stack until a last threadlet at a bottom of the stack, each threadlet associated with a role of the threadlet, wherein the first threadlet of the stack of threadlets includes i) an instance of the first node and ii) a projection menu that includes a respective link to each of one or more projections, and wherein each of the one or more projections includes one or more second threadlets of the stack of threadlets that are instances of nodes that share a relationship to the topic, and the stack of threadlets indicating a particular linear path of nodes of the plurality of nodes;
   providing, for display in a user interface, a maximized representation of the first threadlet based on determining that the first threadlet has a body threadlet role, the body threadlet role indicating that the first threadlet was a last visited threadlet of the stack of sequentially viewable threadlets;
   receiving a user input selecting a particular projection from the one or more projections of the first threadlet; and
   in response to receiving the user input:
   i) updating a role of a particular second threadlet associated with the particular projection to the body threadlet role and updating the role of the first threadlet from the body threadlet role to a tail threadlet role, the tail threadlet role indicating the first threadlet was previously visited, and
   ii) providing, for display in the user interface, a) a maximized representation of the particular second threadlet associated with the selected particular projection based on determining that the particular second threadlet has a body threadlet role, and b) a minimized representation of the first threadlet instead of the maximized representation of the first threadlet based on determining that the first threadlet has the tail threadlet role, the minimized representation of the first threadlet provided for display adjacent to the maximized representation of the particular second threadlet.

2. The method of claim 1, wherein the topic is an entity represented by a node in an online database of structured data, and wherein the first node includes data from the node in the online database of structured data that represents the entity.

3. The method of claim 1, wherein threadlets adjacent to each other are displayed adjacent to each other in the user interface.

4. The method of claim 1, wherein the particular projection is a topic projection that includes only a single threadlet that includes an instance of a node that represents a particular topic.

5. The method of claim 1, further comprising:
receiving a user input selecting the minimized representation of the first threadlet; and
providing the maximized representation of the first threadlet for display in the user interface in place of the particular projection, the maximized representation of the particular second threadlet, and the minimized representation of the first threadlet.

6. A system comprising one or more computers and one or more storage devices storing instructions that, when executed by the one or more computers, cause the one or more computers to perform operations comprising:
determining, from a user input, a topic;
selecting a first node from a plurality of nodes, wherein the first node is a collection of data about the topic;
identifying a stack of threadlets that are sequentially viewable by a user starting from a first threadlet visited at a top of the stack until a last threadlet at a bottom of the stack, each threadlet associated with a role of the threadlet, wherein the first threadlet of the stack of threadlets includes i) an instance of the first node and ii) a projection menu that includes a respective link to each of one or more projections, and wherein each of the one or more projections includes one or more second threadlets of the stack of threadlets that are instances of nodes that share a relationship to the topic, and the stack of threadlets indicating a particular linear path of nodes of the plurality of nodes;
providing, for display in a user interface, a maximized representation of the first threadlet based on determining that the first threadlet has a body threadlet role, the body threadlet role indicating that the first threadlet was a last visited threadlet of the stack of sequentially viewable threadlets;
receiving a user input selecting a particular projection from the one or more projections of the first threadlet; and
in response to receiving the user input:
i) updating a role of a particular second threadlet associated with the particular projection to the body threadlet role and updating the role of the first threadlet from the body threadlet role to a tail threadlet role, the tail threadlet role indicating the first threadlet was previously visited, and
ii) providing, for display in the user interface, a) a maximized representation of the particular second threadlet associated with the selected particular projection based on determining that the particular second threadlet has a body threadlet role, and b) a minimized representation of the first threadlet instead of the maximized representation of the first threadlet based on determining that the first threadlet has the tail threadlet role, the minimized representation of the first threadlet provided for display adjacent to the maximized representation of the particular second threadlet.

7. The system of claim 6, wherein the topic is an entity represented by a node in an online database of structured data, and wherein the first node includes data from the node in the online database of structured data that represents the entity.

8. The system of claim 6, wherein threadlets adjacent to each other are displayed adjacent to each other in the user interface.

9. The system of claim 6, wherein the particular projection is a topic projection that includes only a single threadlet that includes an instance of a node that represents a particular topic.

10. The system of claim 6, the operations further comprising:
receiving a user input selecting the minimized representation of the first threadlet; and
providing the maximized representation of the first threadlet for display in the user interface in place of the particular projection, the maximized representation of the particular second threadlet, and the minimized representation of the first threadlet.

11. A non-transitory computer storage medium encoded with a computer program, the program comprising instructions that when executed by one or more computers cause the one or more computers to perform operations comprising:
determining, from a user input, a topic;
selecting a first node from a plurality of nodes, wherein the first node is a collection of data about the topic;
identifying a stack of threadlets that are sequentially viewable by a user starting from a first threadlet visited at a top of the stack until a last threadlet at a bottom of the stack, each threadlet associated with a role of the threadlet, wherein the first threadlet of the stack of threadlets includes i) an instance of the first node and ii) a projection menu that includes a respective link to each of one or more projections, and wherein each of the one or more projections includes one or more second threadlets of the stack of threadlets that are instances of nodes that share a relationship to the topic, and the stack of threadlets indicating a particular linear path of nodes of the plurality of nodes;
providing, for display in a user interface, a maximized representation of the first threadlet based on determining that the first threadlet has a body threadlet role, the body threadlet role indicating that the first threadlet was a last visited threadlet of the stack of sequentially viewable threadlets;
receiving a user input selecting a particular projection from the one or more projections of the first threadlet; and
in response to receiving the user input:
i) updating a role of a particular second threadlet associated with the particular projection to the body threadlet role and updating the role of the first threadlet from the body threadlet role to a tail threadlet role, the tail threadlet role indicating the first threadlet was previously visited, ii) providing, for display in the user interface, a) a maximized representation of the particular second threadlet associated with the selected particular projection based on determining that the particular second threadlet has a body threadlet role, and b) a minimized representation of the first threadlet instead of the maximized representation of the first threadlet based on determining that the first threadlet has the tail threadlet role, the minimized representation of the first threadlet provided for display adjacent to the maximized representation of the particular second threadlet.

12. The non-transitory computer storage medium of claim 11, wherein the topic is an entity represented by a node in an online database of structured data, and wherein the first node includes data from the node in the online database of structured data that represents the entity.

13. The non-transitory computer storage medium of claim 11, wherein threadlets adjacent to each other are displayed adjacent to each other in the user interface.

14. The non-transitory computer storage medium of claim 11, wherein the particular projection is a topic projection that includes only a single threadlet that includes an instance of a node that represents a particular topic.

15. The non-transitory computer storage medium of claim 11, the operations further comprising:

receiving a user input selecting the minimized representation of the first threadlet; and providing the maximized representation of the first threadlet for display in the user interface in place of the particular projection, the maximized representation of the particular second threadlet, and the minimized representation of the first threadlet.

* * * * *